Dec. 22, 1959   S. I. STRICKHOUSER ET AL   2,917,749
BATHING CAP
Filed Jan. 10, 1957
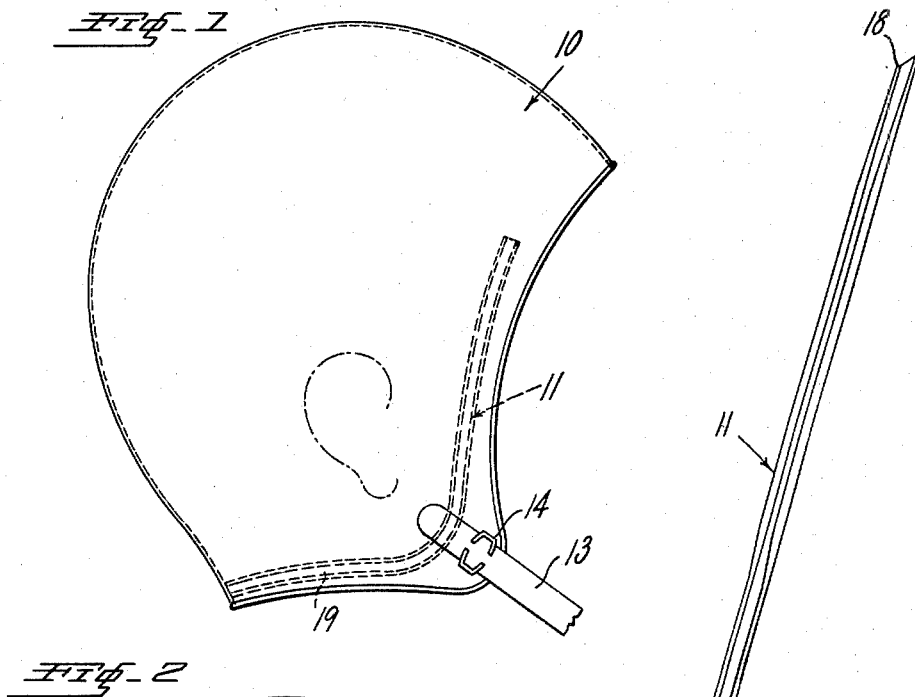
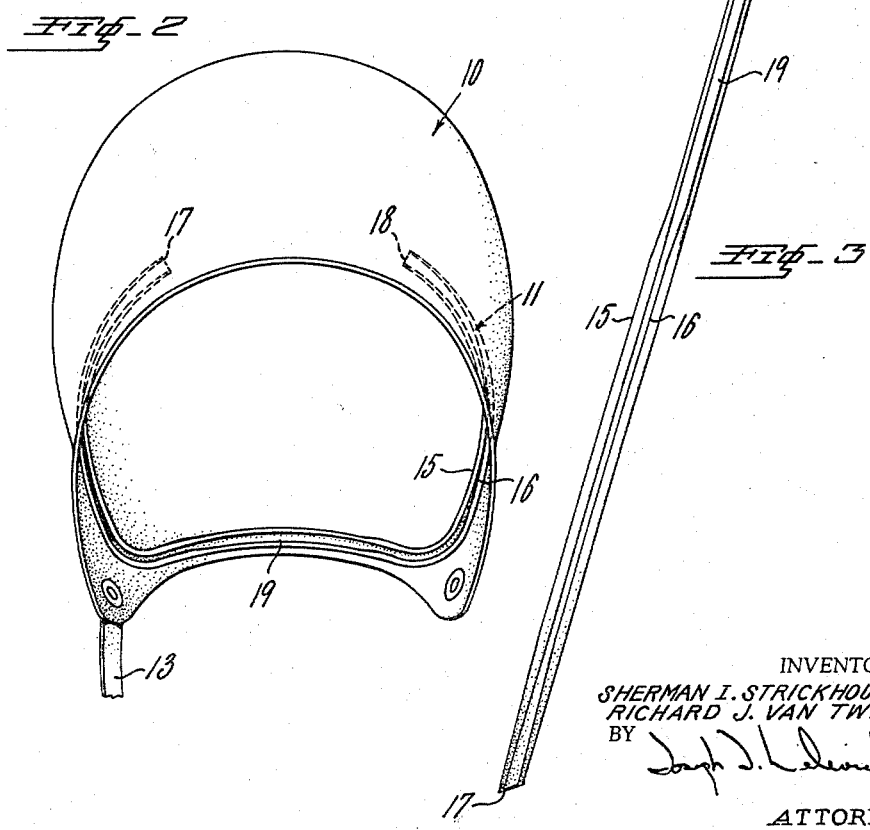
INVENTORS
SHERMAN I. STRICKHOUSER
RICHARD J. VAN TWISK
BY
ATTORNEY

United States Patent Office 2,917,749
Patented Dec. 22, 1959

2,917,749

BATHING CAP

Sherman I. Strickhouser, East Greenwich, and Richard James Van Twisk, Barrington, R.I., assignors to United States Rubber Company, New York, N.Y., a corporation of New Jersey Application January 10, 1957, Serial No. 633,447

2 Claims. (Cl. 2—68)

This invention relates to bathing caps and is particularly directed to a cap made of expanded polyvinyl chloride plastisol resin by a dipping process.

Bathing caps as presently made have a body portion for enclosing the head of the wearer while leaving the face exposed and are made of some waterproof elastic material, generally rubber. A band is affixed to the inside surface near the edge of the cap which acts as a seal to prevent entering of water between the cap and the head.

The objection with caps made of rubber lies in the sacrifice of comfort that is made in order to obtain the water-proofing characteristic. A cap when worn is ordinarily stretched about 10 to 15% and, consequently, if it is of a high modulus of elasticity, as is the case with rubber caps, the force it exerts on the head makes it uncomfortable if worn for any length of time; furthermore, such a cap is difficult to don or remove.

A cap can be made of foam rubber that has a lower modulus of elasticity and to a certain extent overcomes the discomfort. But, on the other hand, since foam is a number of interconnecting cells, it absorbs water, unless it is provided with an impervious skin. If it is dip formed, it cannot be made in a single dipping; separate dippings to provide an impervious skin are required; naturally, the additional dippings increase the cost of production and tend to make the cap uneconomical.

A further disadvantage of rubber caps in general, is that their life is greatly reduced in areas of high ozone concentrations. Rubber is readily attacked by ozone; it discolors, cracks and becomes soft. In some areas of the country there are times when the cap will not endure two weeks exposure to the air.

The present invention provides a bathing cap which has the wearing comfort of a foam rubber cap without its water absorbing disadvantage. It is formed of expanded plasticized vinyl which has substantially a closed-cell construction that is relatively impervious to water. The inside surface of the cap near the edge is provided with an integral sealing band of the same material but having a higher modulus of elasticity that is designed for comfort as well as sealing.

A cap, according to this invention having the predominantly closed cell construction, possesses the further advantage of being floatable. Its specific gravity is less than that of water and its buoyancy reduces the possibility of loss in water and aids in maintaining the head of the wearer afloat when he is immersed in water.

In addition, an expanded plasticized vinyl material cap has the smooth, soft, texture which is a pleasant feel to the touch of the head as compared to non-cellular and foam rubber materials heretofore used in caps. Furthermore, a bathing cap can be made having a predominantly closed cell construction with one dipping.

For further characteristics and advantages of the bathing cap according to this invention, reference should be made to the following description in the accompanying drawings, wherein:

Fig. 1 is a side view of a bathing cap constructed in accordance with the present invention;

Fig. 2 is a front view of the cap of Fig. 1; and

Fig. 3 is a perspective view showing the sealing band.

Referring to the drawings, the bathing cap embodying this invention comprises a cap body 10, having secured to its inner surface a water excluding or sealing band 11. The cap body 10 conforms closely to the configuration of the wearer's head and is decorated with an ornamental design, not shown, if so desired. The usual chin strap 13 having an adjustable element 14 of conventional construction is snap fastened, not shown, on the cap.

The water excluding band 11 extends around the free edge of the cap body 10, from a point to the side of the forehead around the back of the neck to a similar point on the opposite side. Thus, the cap is without any band projection on its inner surface at the forehead portion. The band 11 has two inwardly extending spaced ribs 15, 16, triangular in cross-section and of increasing height from its ends 17, 18 and middle portion 19 (Fig. 3). The ribs 15 and 16, consequently, are higher around the ear portion of the head than at the back of the neck or near the forehead.

The importance of this construction is apparent in considering the surfaces of the cap and head against which the cap seals. The forehead is smooth, as is the cap portion which lies against it. When together, these surfaces provide an adequate seal without other provisions. The back of the neck is not as smooth as the forehead, but the cap portion covering it can be contricted by tightening the chin strap 13. Accordingly, the sealing band 11 is more of a reinforcing and the ribs 15 and 16 are not as prominent. Around the ears, head is ridged; moreover, the chin strap 13 does not constrict the cap edges in these areas. The band 11, therefore, has significant ribs 15, and 16 to fill in between the ridges of the head. In this manner the cap seals around the head with a minimum in loss of comfort to the wearer.

As previously pointed out the invention primarily contemplates a particular material, expanded vinyl plastisol, from which the bathing cap is constructed. This material when used in the body portion 10 of the cap is a substantially cellular plastisol, that is unlike sponge rubber in which the air spaces of the material are interconnected. It is composed of a multiplicity of minute cells most of which are encased in a wall of plastisol as though they were tiny balloons. The cells are filled with an inert gas that expands the material, and since there is practically no communication between them, they provide the product with resilience, lightness of weight, buoyancy and a negligible moisture absorption property.

One suitable composition that may be used is the following, the parts being given by weight:

Resin (polyvinyl chloride) _____ 100
Plasticizer (dioctyl phthalate) _____ 130
Stabilizer (dibasic lead) _____ 1.60
Blowing agent (celogen AZ) _____ 0.75
Pigments to suit color desired.

The same composition is used for both the body portion 10 and the sealing band 11, except that only one-half as much blowing agent is used in the sealing band and also 10 parts nylon and 10 parts each of whiting and clay are added.

In processing the above composition all the ingredients, including pigments, if desired, are mixed with a stirrer until a uniform liquid is produced. It is to be understood that two batches, one for the sealing band and one for the body portion of the cap, are made. An open mold having a cavity suitable to the shape of the sealing band, is then filled with material from the sealing band batch and heated for 8 to 13 minutes, dependent upon thickness and heat transferring properties of the metal mold, at a temperature of 400° F. This gels the composition to a tacky solid which is not completely fused.

The cap body is made by dipping a metal form that has been preheated to the proper temperature. The heat of the form causes some of the composition to gel and adhere to the form as a film. To a point, the degree of heat of the form and the length of dipping determines the amount of material that will adhere to the form. For best results, the form is heated to 200° F. and dipped for 35 seconds. After dipping the form is heated in an oven until the adhered film becomes gelled. For a thickness of .025 inch in a finished cap it requires heating for 4 minutes at a temperature of 390° F.

On gelling of the film, the form is removed from the oven; the sealing band is stripped from the open mold and applied to the incompletely fused film. There is no need for cement, since neither the band nor film are completely fused and both are sufficient tacky to cause adherence to each other.

After the sealing band is applied, the attached band and film are further heated as a unit until fused to integrally unite them together. In practice a fuse at 390° F. for 7½ minutes is usual. Thereafter, the film is stripped from the form, trimmed, and turned inside out to become a cap with a sealing band on the inner surface.

It is desired to point out that the amount of blowing agent used is important. Six to eight tenths percent of blowing agent by weight as compared to the amount of resin used will produce a substantially closed cell material. Higher percentages will produce material that is more open cell than closed cell which will absorb water much like a sponge. Lower percentages reduce the number of cells and consequently, cause a proportionate loss of resilience in the material produced.

For the sealing band it is best to use as little as ½ the blowing agent used for the cap body or else no blowing agent, otherwise, the band will stretch too easily and may be ineffective as a seal.

A cap made as described above will have a body gauge of .025 inch. It will be of substantially closed blown cell material, soft, resilient and practically non-water absorbent, i.e., it will absorb less than 10% water by weight. Both the inner and the outer body surfaces of the cap will be almost perfectly smooth. For 10 to 15% stretch it will require only about one-half the force needed for a similar cap of rubber. It will have a specific gravity of from .7 to .9, which is sufficiently low to float the cap. The band will be of the same material and an integral part of the cap, but will have half the stretch.

While the preferred form of the invention has been described more or less in detail, changes may be made without departing from this invention and it is intended to cover such changes in the appended claims.

Having thus described our invention, what we claim and desire to protect by Letters Patent is:

1. A water impervious bathing cap comprising a cap body made of a predominantly closed cell expanded vinyl chloride plastisol resin, and a sealing band of the same resin having a higher modulus of elasticity than said body and integrally fused to the inner surface of said body near its edge extending from a side of said body around its back to the opposite side, said cap having a specific gravity of from .7 to .9.

2. A water impervious bathing cap comprising a single layer of a predominantly closed cell expanded vinyl chloride plastisol material and having smooth inner and outer surfaces, and a sealing band of non-cellular vinyl plastisol material affixed to the inner surface of said body near its edge extending from a side of said cap body around its back to the opposite side and having an outwardly extending rib increasing in height from the ends and the middle of said band, said cap having a specific gravity less than water and a water absorption capacity of less than 10%.

References Cited in the file of this patent

UNITED STATES PATENTS

| | | |
|---|---|---|
| 1,771,178 | Howland | July 22, 1930 |
| 1,950,081 | De Laney | Mar. 6, 1934 |
| 2,029,379 | L'Hollier et al. | Feb. 4, 1936 |
| 2,324,735 | Spanel | July 20, 1943 |
| 2,520,048 | Moore | Aug. 22, 1950 |
| 2,684,341 | Anspon et al. | July 20, 1954 |
| 2,869,133 | Garbellano | Jan. 20, 1959 |

FOREIGN PATENTS

| | | |
|---|---|---|
| 607,836 | Great Britain | Sept. 6, 1948 |

OTHER REFERENCES

British Plastics, April 1948, pages 167 to 171, incl. (Copy in Scientific Library, U.S. Patent Office.)